(12) United States Patent
Lazarus et al.

(10) Patent No.: US 8,827,720 B1
(45) Date of Patent: Sep. 9, 2014

(54) SIMULATION TOOLS, TRAINERS, SYSTEMS AND METHODS FOR TRAUMA ASSESSMENT AND TOURNIQUET TRAINING APPLICATIONS

(75) Inventors: Todd Lazarus, Orlando, FL (US); Glenn A. Martin, Orlando, FL (US)

(73) Assignees: CHI Systems, Inc., Orlando, FL (US); University of Central Florida Research Foundation, Inc., Orlando, FL (US)

( * ) Notice: Subject to any disclaimer, the term of this patent is extended or adjusted under 35 U.S.C. 154(b) by 129 days.

(21) Appl. No.: 13/422,502

(22) Filed: Mar. 16, 2012

Related U.S. Application Data

(60) Provisional application No. 61/454,098, filed on Mar. 18, 2011.

(51) Int. Cl.
*G09B 23/28* (2006.01)
(52) U.S. Cl.
USPC .......................................................... 434/262
(58) Field of Classification Search
USPC ........................... 434/262–275; 345/156, 184
See application file for complete search history.

(56) References Cited

U.S. PATENT DOCUMENTS

| | | | |
|---|---|---|---|
| 3,852,893 A | 12/1974 | Smrcka | |
| 5,423,685 A * | 6/1995 | Adamson et al. | 434/265 |
| 5,480,307 A * | 1/1996 | Lang et al. | 434/263 |
| 6,638,073 B1 | 10/2003 | Kazimirov | |
| 2007/0292829 A1 * | 12/2007 | King et al. | 434/268 |
| 2009/0011394 A1 | 1/2009 | Meglan | |
| 2011/0195387 A1 * | 8/2011 | Hsiao et al. | 434/265 |
| 2011/0212426 A1 * | 9/2011 | Gloeggler et al. | 434/262 |
| 2012/0202180 A1 * | 8/2012 | Stock et al. | 434/272 |
| 2013/0203032 A1 * | 8/2013 | Bardsley et al. | 434/268 |

* cited by examiner

*Primary Examiner* — Timothy A Musselman
(74) *Attorney, Agent, or Firm* — Molly Sauter; Smith & Hopen, P.A.

(57) ABSTRACT

Systems, methods and devices for trauma assessment and tourniquet, cricoids cartilage and tension pneumothorax training including use of modular arms, legs and torso parts, that each include self-contained simulators having realistic symptoms of bleeding, pulse rates, smells and the like so that students can be trained to both assess patient trauma and train students to control bleeding through tourniquets. Also the use of digital communication devices for presenting educational content and controlling the operations of the modular system parts for training purposes. Devices and methods of teaching cricothyrotomy techniques through reusable neck collars having segmented fluid filled chambers, adjustable trachea tools with moveable parts, as well as enhanced teaching and recording the teaching results from multiple students.

31 Claims, 24 Drawing Sheets

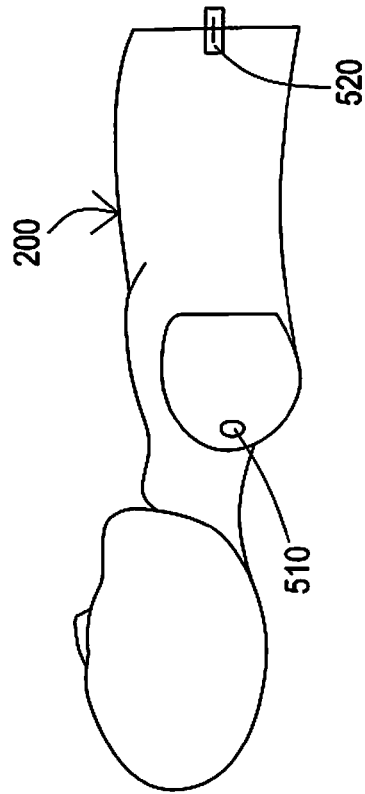
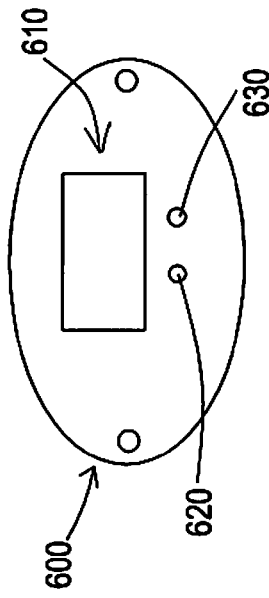
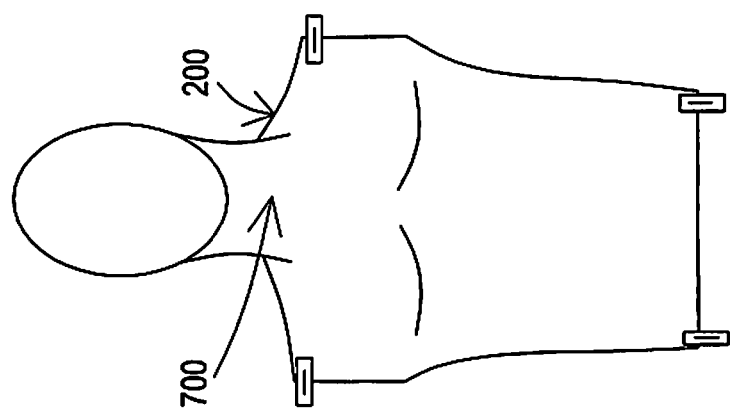
FIG. 2B
FIG. 2C
FIG. 2A

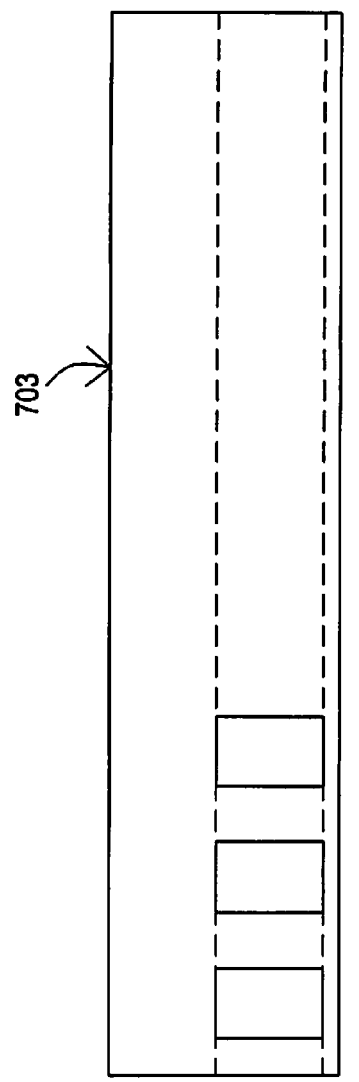
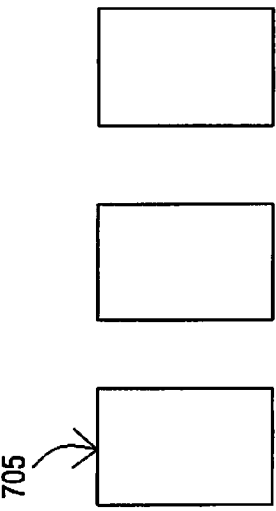
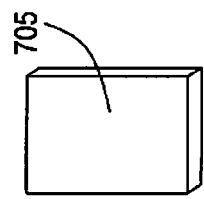
FIG. 4A
FIG. 4B
FIG. 4C

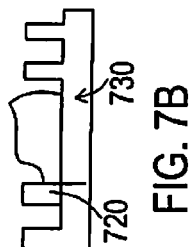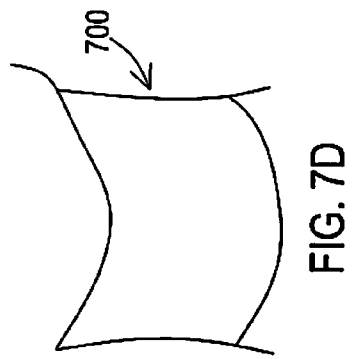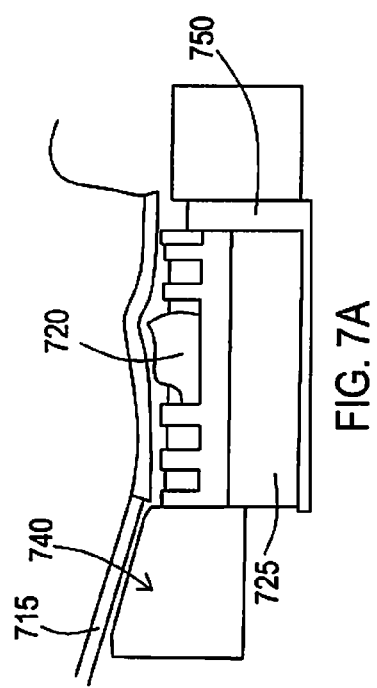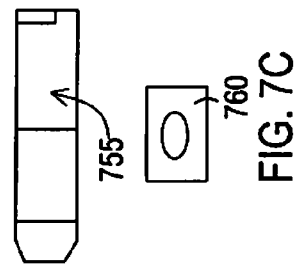

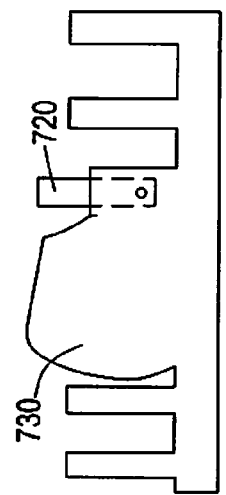
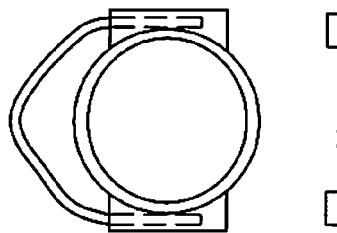
FIG. 8B
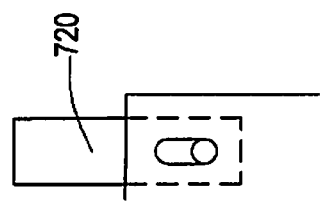
FIG. 8D
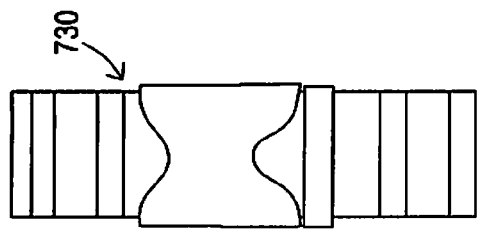
FIG. 8A

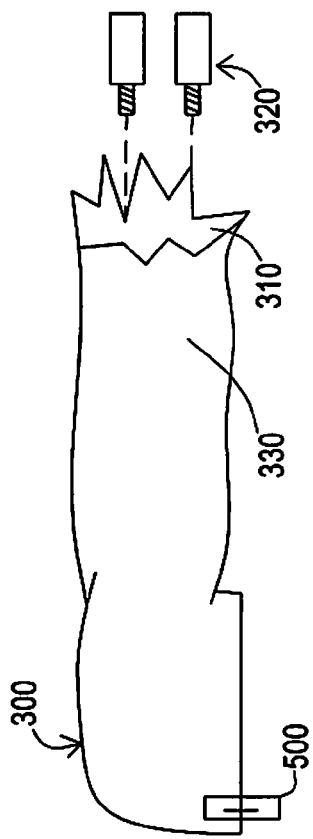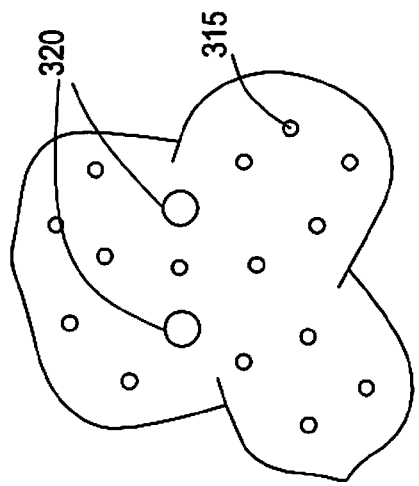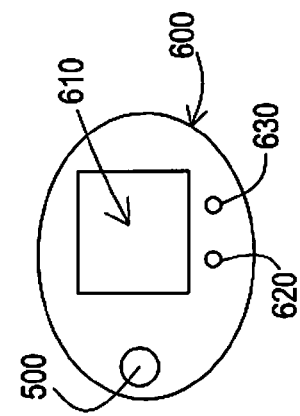

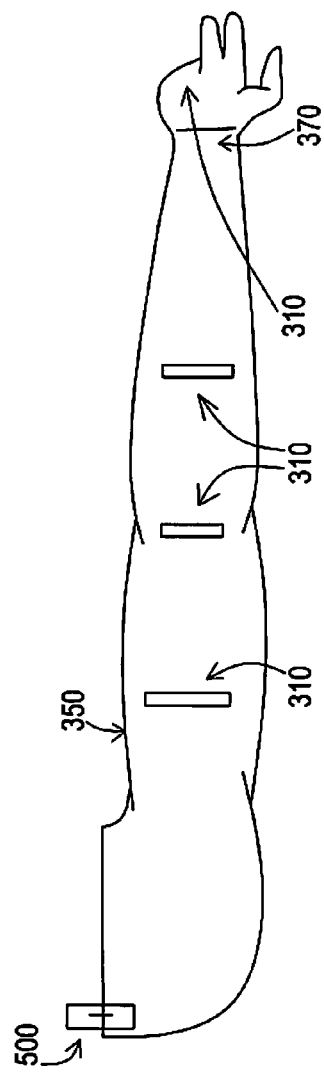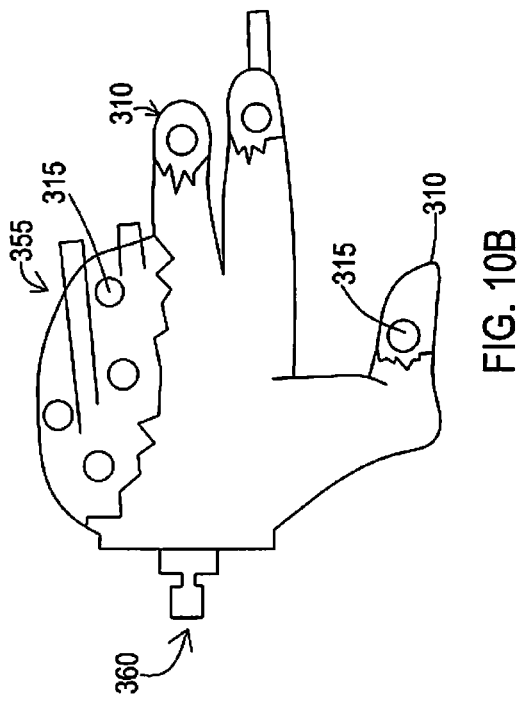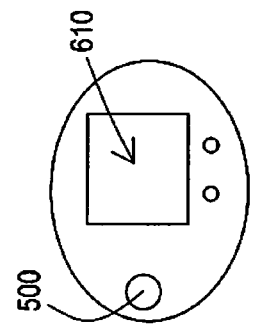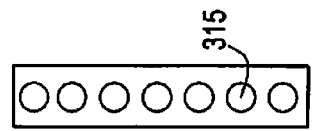
FIG. 10A
FIG. 10B
FIG. 10C
FIG. 10D

FIG. 18A

SELECT A WOUND
LOCATION:

SIMULATED BODY SIZE: [MEDIUM]

TIME UNTIL BLEEDOUT: [NEVER]

START DELAY [NONE]

[START]

FIG. 18B

TOURNIQUET PLACEMENT: NO

NUMBER OF TOURNIQUETS: 0

BLEEDING STOPPED AT: 0:00

PATIENT STATUS : ALIVE

PRESSURE: [　　]

BLOD FLOW: [　　]

[DISCUSSION] [RESET]

FIG. 18C

WHY IS SECOND TOURNIQUET
NEEDED TO STOP BLEEDING?

WHY MORE OR LESS
DIFFICULT TO STOP BLEEDING
FROM EXTREMITY WOUND?

TOURNIQUET IN PLACE,
BLEEDING STOPED, WHEN TO
REMOVE IT?

[BACK]

SIMULATION TOOLS, TRAINERS, SYSTEMS AND METHODS FOR TRAUMA ASSESSMENT AND TOURNIQUET TRAINING APPLICATIONS

This application claims the benefit of priority to U.S. Provisional Application No. 61/454,098 filed on Mar. 18, 2011.

GOVERNMENT LICENSE RIGHTS

This invention was made with government support under Army Contract SBIR A05-215-1758 and Phase 1 contract number N61339-06-C-0009 and Phase 2 contract N61339-06-C-0117, Army contract W91CRB-09-C-0056, and Army contract W91CRB-10-C00184. The government has certain rights in this invention.

FIELD OF INVENTION

This invention relates to medical simulation, and, in particular to trauma assessment and tourniquet, cricoids and tension pneumothorax training systems, devices and methods of using modular arms, legs and torso parts, that each include self-contained simulators having realistic symptoms of bleeding, pulse rates, smells and the like, so that students can be trained to both assess patient trauma, and students can be trained to control bleeding through tourniquets, and the use of digital communication devices for controlling the operations of the modular system parts for training purposes.

BACKGROUND AND PRIOR ART

Various types of devices have been used as a limb hemorrhage trauma simulator over the years. See for example, U.S. Patent Application Publication US 2009/0011394 to Meglan et al., which is generally limited to human limbs, and mentions that light emitting diodes (LEDs) can be used but they are restricted to turning on particular LEDS or adjusting the intensity of the LEDS. However, this simulator disclosed has limitations and problems.

This simulator requires that each limb be separately attached to an external computer device that includes an external simulator, a controller, a display, and the like that appear to be a desktop computer and large display screen. Additionally, this simulator does not describe controlling the flashing rate of the LEDS to cover different amounts of blood loss. Additionally, this simulator has no description for monitoring a body torso. Furthermore, this simulator does not allow for each limb to have its own stand alone simulator and controller and display built directly into the limb, so that the limb parts can be separately used at the same time.

The Institute for Simulation and Training (IST) at the University of Central Florida and CHI Systems, Inc. which includes the main inventors and assignee for the subject invention disclosed a simulation trainer between 2006 and 2009 with a haptic model having realistic visual and tactile feedback. However, this demonstrated simulator was limited in use and applications.

The IST/CHI Systems simulator was generally restricted to a single arm limb, with some LED output similar to the Meglan et al. publication, and a customized PDA (personal digital assistant) device having limited remote control capability that required preprogrammed software limited to controls for a single arm limb.

Other types of training devices have been disclosed over the years, but also have similar limitations. See for example, U.S. Pat. No. 3,852,893 issued to Smrcka on Dec. 10, 1974 that describes a limb for a first aid training dummy molded of an integral skin foam shaped to define a simulated wound with a flexible plastic tube for supplying simulated blood. Aligned with the tube is a simulated bone which permits pressure to be applied to the wound or the tube to block the flow of simulated blood; and U.S. Pat. No. 6,638,073 issued to Kazimirov et al. on October 283, 2003 that discloses a model of a human being that includes a head unit, a neck unit, a trunk unit with upper and lower extremities connected together so as to be capable of movement. The training device also includes video simulators for the internal organs of a human being and traumas to the internal organs with the simulators connected to a computer.

These systems also focused on understanding the internal organs and practice on a dummy rather than training users to provide life saving procedures in the field prior to being transported to a medical facility. It is not enough to simply have a device in which to practice (especially if such practice is performed incorrectly). Leveraging an entire training system includes devices as well as software to drive the training process.

Thus, the need exists for solutions to the above problems with the prior art for training users to perform life saving triage in the field.

SUMMARY OF THE INVENTION

A primary objective of the present invention is to provide versatile extremities training systems, methods and devices for teaching trauma assessment and tourniquet application skills, and for teaching cricothyrotomy procedures, having modular components of separate arms, legs, torso and head parts, with each of the components having their own built-in simulation controls that allow for separate teaching tools.

A secondary objective of the present invention is to provide versatile extremities training systems, methods and devices for teaching trauma assessment and tourniquet application skills, and for teaching cricothyrotomy procedures, having remote controls through various portable handheld digital devices, that can be programmed by the user and easily updated with additional teaching tools and computer programs that can include but are not limited to an iPhone®, iPad™, and mobile phones.

A third objective of the present invention is to provide versatile extremities training systems, methods and devices for teaching trauma assessment and tourniquet application skills, and for teaching cricothyrotomy procedures, having modular components of separate arms, legs, torso and head parts, with each having their own LEDS that have adjustable flashing rates from rapid flashing to show large blood loss to slow flashing to show small blood loss.

A fourth objective of the present invention is to provide versatile extremities training systems, methods and devices for teaching trauma assessment and tourniquet application skills, and for teaching cricothyrotomy procedures, having modular components of separate arms, legs, torso, head and neck parts, that enables enhanced teaching and assessment testing of multiple students simultaneously along with recording capability from those students, and real-time feedback capability.

A fifth objective of the present invention is to provide other tools, devices, systems and methods of teaching trauma training, and for teaching cricothyrotomy procedures that can include an easily reusable neck skin collar having segmented chamber pockets of fluids that allow for teaching cricothyrotomy skills to students.

A sixth objective of the present invention is to provide other tools, devices, systems and methods of teaching trauma training, and for teaching cricothyrotomy procedures, that can include an adjustable trachea tool with moveable parts.

A seventh objective of the present invention is to provide other tools, devices, systems and methods of teaching trauma training, and for teaching cricothyrotomy procedures, having a head and neck parts with sensors to monitor progress of trainees performing a cricothyrotomy.

The invention can give audible breathing cues in the different cricothyrotomy scenarios. The arm and legs can give different pulse rates during the hemorrhage control that can lead to different physiology status. The next NCD model can provide training for Tension Pneumothorax.

A modular simulation system for trauma assessment and tourniquet, cricoids cartilage and tension pneumothorax training, can include a torso with detachable limbs including sensors for detecting a simulated user activity and outputs to simulate an injury status in response to the user activity, a simulated exterior skin covering the torso and limbs, and a self-contained processor controller for executing instructions stored in memory and a power source for each of the torso and limbs, the controller connected with the sensors and the outputs.

The detachable limbs can include a right arm, a left arm, a right leg and a left leg. The arm can include a simulated partial amputation of one of the arm and a hand. The arm can include a simulated injured arm having one or more simulated lacerations.

The leg can include a simulated partial amputation of one of the leg and a foot. The leg can include a simulated injured leg having one or more simulated lacerations.

Each of the limbs can include a snap in place universal swivel joint having a male component member insertable into a female component to attach the limbs to the torso.

Each of the limbs can include at least one LED(light emitting diode) arrangement pattern on the limb to simulate a bleeding injury.

The instruction can include a first set of instruction to activate LEDS(light emitting diodes) to indicate blood loss to turn off LEDS in sequence as a tourniquet is applied to a limb to indicate lower amounts of blood loss.

Each of the limbs can include a pulse simulator for determining a limb pulse.

The system can further include an inner support structure to simulate a skeletal structure, an intermediate layer covering the inner support structure to simulate muscle and body fat, and a simulated outer skin covering the intermediate layer.

The simulated outer skin can include a styrene-ethylene/butylenes-styrene material.

The sensors can include an arrangement of sensors between the simulated outer skin and one of the intermediate layer and the inner support structure for sensing application of a tourniquet around the simulated limb.

The torso can include a simulated lung including an inflatable balloon positioned under the simulated outer skin on the torso.

The system can include a molded rib structure located between the simulated lung and the simulated torso skin.

The torso can include a lung platform controllably raised and lowered to simulate breathing. The torso can include a simulated lung including an inflatable balloon positioned under the simulated outer skin on the torso, and a lung platform below the inflatable balloon controllably raised and lowered to simulate breathing. The torso can include a simulated neck anatomy. The simulated neck anatomy can include a rotatable neck band having separate chambers with red colored fluid for teaching cricothyrotomies procedures.

The system can include a simulated active cricoids cartilage that surrounds a simulated tracheal soft tissue insert. The system can include a simulated sliding cricoids cartilage. The simulated active cricoids cartilage can be made of a pliable urethane foam to allow for movement. The system can include a membrane holder made plastic tubing and fits around the simulated tracheal soft tissue insert.

The system can include carrying cases for each of the torso, the right arm, the left arm, the left leg and the right leg. Each of the carrying cases can include a case cutout for the torso, and a cutout for each limb, with a pocket for wireless Android control, a pocket for a stand and a pocket for removable tourniquets.

The interface controls for the torso, the right arm, the left arm, the right leg and the left leg can each include a touch screen.

The system can include a wireless handheld device for presenting educational content and controlling the torso and detachable limbs. The wireless device can be a smart phone, such as but not limited to an iPhone® or Android™.

A cricothyrotomies training tool can include a circular neck collar having a plurality of side by side separated chambers, each of the chambers being sealed with colored fluid therein, wherein wrapping the circular neck collar about a simulated neck allows for students to continuously train for a cricothyrotomy by cutting a slit into a chamber in front of the trachea, and the collar is rotated so that an uncut chamber is located in front of the trachea. The fluid can be food coloring in soapy water.

A simulated neck device with cartilage for teaching tracheotomies, can include a thyroid and sliding cricoids cartilage on a front portion of a simulated neck, and a thin piece of plastic tape is installed over the thyroid & sliding cricoids cartilage to act as the muscle and ligament tissues, wherein a trainee forms an incision into the tape, and a tracheal hook is insertable into the incision to pull up on the sliding cricoids cartilage to provide room for installing an endotracheal tub.

The simulated neck device can include a circular neck band having a plurality of side by side separated chambers, each of the chambers being sealed with colored fluid therein, wherein wrapping the neck band about the simulated neck part allows for trainees to continuously train for a cricothyrotomies by cutting a slit into a chamber in front of the trachea, and the collar is rotated so that an uncut chamber is located in front of the trachea for each subsequent trainee.

The simulated neck device can include internal sensors placed in a bronchi branch in the simulated neck device providing feedback on endotracheal tube placement, the sensors measure each lung volume during ventilation to determine bilateral symmetry proficiency.

The simulated neck device can include sensors to monitor both head and bust positions to determine initial assessment and interaction during a test. and sensors within nostrils or in the head to monitor any nasopharyngeal airway placement within the trial.

Further objects and advantages of this invention will be apparent from the following detailed description of the presently preferred embodiments which are illustrated schematically in the accompanying drawings.

BRIEF DESCRIPTION OF THE FIGURES

FIG. 2a is a front view of the simulated torso of FIG. 1 without the detachable limbs.

FIG. 2b is a side view of the simulated torso of FIG. 2a.

FIG. 2c shows a touch screen interface of the electronic simulation module that is located on the back of the simulated torso.

FIG. 4a shows an example of a blood packet stencil used for producing blood packets.

FIG. 4b shows the spacing between adjacent blood packets produced from the stencil shown in FIG. 4a.

FIG. 4c shows a packet volume for a blood packet of FIG. 4b.

FIG. 7a is a side view of the simulated torso showing the simulated neck anatomy including the bronchi branch, foam neck muscles and trachea stabilizer.

FIG. 7b is an exploded side view showing the active cricoids cartilage insert for the neck shown in FIG. 7a.

FIG. 7c is an exploded view showing the tracheal soft tissue insert and membrane clip for the neck shown in FIG. 7a.

FIG. 7d shows a cross-sectional view of the check and neck connections of FIG. 7a.

FIG. 8a shows an enlarged exterior front view of the sliding cricoids cartilage.

FIG. 8b shows an end view of the sliding cricoids cartilage of FIG. 8a.

FIG. 8c shows a cross-sectional view of the sliding cricoids cartilage of FIG. 8a.

FIG. 8d is an enlarged view of the sliding cartilage of FIG. 8a.

FIG. 9a is front view of the detached left arm of the invention with LEDs simulating a wound.

FIG. 9b shows an LED arrangement for the LED wound of FIG. 9a.

FIG. 9c shows the touch screen interface for the left arm of FIG. 9b.

FIG. 10a is a front view of the detached right arm of the invention.

FIG. 10b is a front view of the detached right hand from the right arm of FIG. 10a.

FIG. 10c shows the touch screen interface for the right arm of FIG. 10a.

FIG. 10d shows an LED arrangement for the LED wound(s) of FIG. 10a.

FIG. 11b is a front view of the detached foot wound for the left leg of FIG. 11a.

FIG. 12b shows an amputated end with LED wounds for the right leg of FIG. 12a.

FIG. 12c shows an LED arrangement for other wounds along the right leg of FIG. 12a.

FIG. 12d is a cross-sectional view of the structural layers of the right leg of FIG. 12a.

FIG. 18a is a screen shot of the Cric welcome screen on the HapMed for the invention.

FIG. 18b is a screen shot of the Cric startup screen on the HapMed for the invention.

FIG. 18c is a screen shot of the Cric simulation screen on the HapMed for the invention.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figure 1:
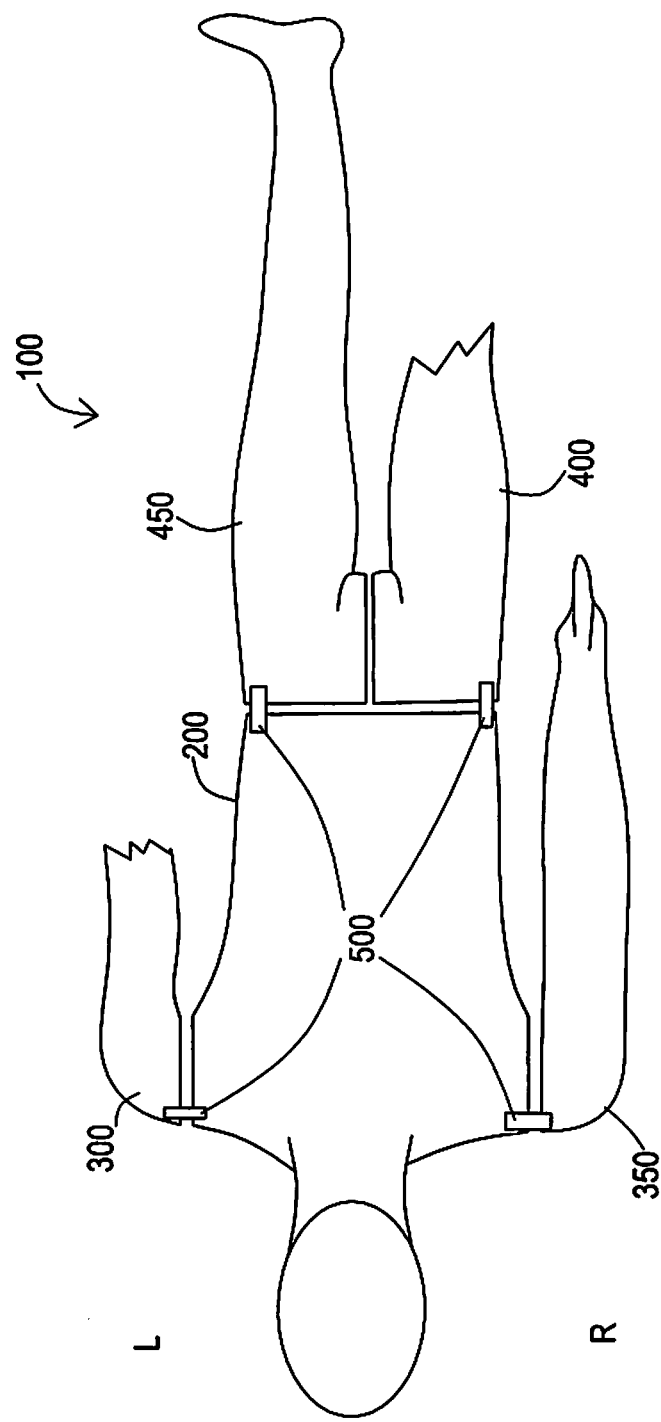
FIG. 1 shows a complete simulated body layout of the invention showing snap detachable limbs on a simulated torso.

The following is a list of reference numerals used in the description and the drawings to identify components:
100 simulated body
200 simulated torso
205 chest simulated skin
210 lung
220 ribs
230 right decompression site
235 left decompression site
250 lung platform
252 lung balloon
255 lung servo motor
257 pivotal arm
300 partially amputated arm
310 LED wound
315 LEDs
320 bone screws
330 brachial pulse
350 wounded arm
370 radial pulse
400 wounded leg
450 partially amputated leg
500 connectors
600 simulation electronic module
700 neck anatomy
703 blood packet stencil
705 blood packet 710 tubular neckband
720 neckband covering
800 sensory array
810 sensor FIG. 1 shows a complete body layout of the simulator with snap in place upper and lower extremities that can be attached to a torso 200 to form a complete simulated body 100. The simulated limbs include, in the example shown, a partially amputated left arm 300 and an injured right arm 350; a partially amputated right leg 400 and a wounded left leg 450. Each of the simulated limbs can be snapped into the torso 200 by universal joints/electrical connectors 500 for training use. Connectors can include but not be limited to male/female connectors, threadable connectors, and the like. Alternatively, each of the simulated limbs and the simulated torso can be detached to form individual simulators.

Each of the modular pieces shown in FIG. 1 is used for completing TASKS, torso 500, arms 300 and 350 and legs 400 and 450 simulate the human anatomy in that there is an inner support structure simulating the skeletal or bone structure, an intermediate layer simulating muscle and fat covered with simulated outer skin. Each modular piece is designed and constructed to pass the rigors of medical assessment and intervention following the military training curriculum.

The skin can be made of SEBS (styrene-ethylene/butylene-styrene) that gives a very realistic feel and resisted cutting and tearing with repeated contractions using a tourniquet. FIG. 2a is a front view of the torso shown in FIG. 1 with the upper and lower extremities (arms and legs) detached from the torso. FIG. 2b is a side view of the torso of FIG. 2a showing the universal joints for attaching the limbs to the torso. As shown, the simulated arms preferably connect with the simulated torso at the shoulder joint 510 while the simulated right and left leg attached to the torso at the simulated hip joint 520. FIG. 2c is a bottom view of the torso of FIG. 2a showing the simulation electronic module 600 with a touch screen interface 610, power on/off switch 620 and charging port.

Figure 3A:
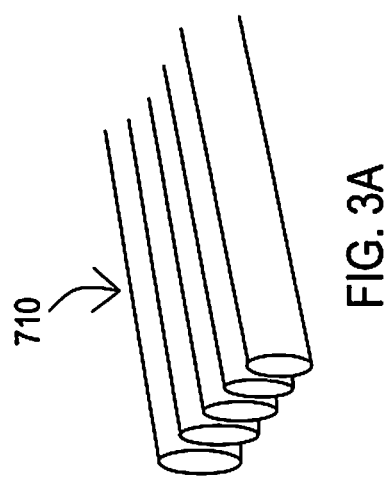
FIG. 3a shows a tubular neckband for use with the invention.
Figure 3B:
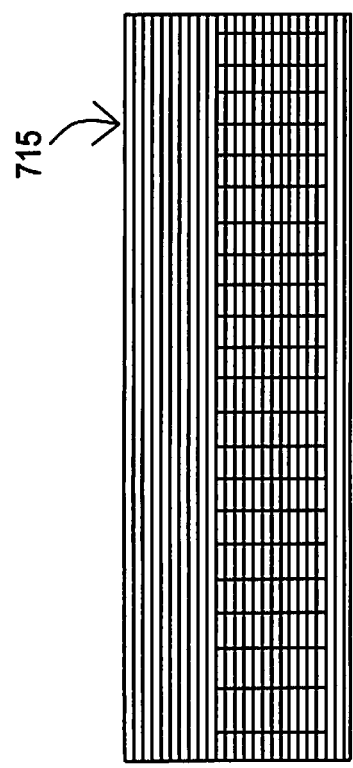
FIG. 3b shows the simulated neckband of FIG. 3a coated with a simulated skin material.

The simulation electronic module can includes a computer processing device for executing a set of instructions stored in memory and interfaces in plural different input and output devices located throughout the simulated torso. As shown in FIG. 2a, the torso can include neck anatomy. FIGS. 3a and 3b show a tubular neckband 710 that can be coated to fill between the adjacent tubular bands to form simulated skin 715 on the neck. Sections of one or more of the tubular bands 710 can be filled with simulated blood and the coating can be made of a durable material for added protection to prevent damage. FIG. 4a shows an example of a blood packet stencil used for producing blood packets. FIG. 4b shows the spacing between adjacent blood packets produced from the stencil and FIG. 4c shows an approximate volume of the blood packet for use with the tubular neckband, for example.

Figure 5:
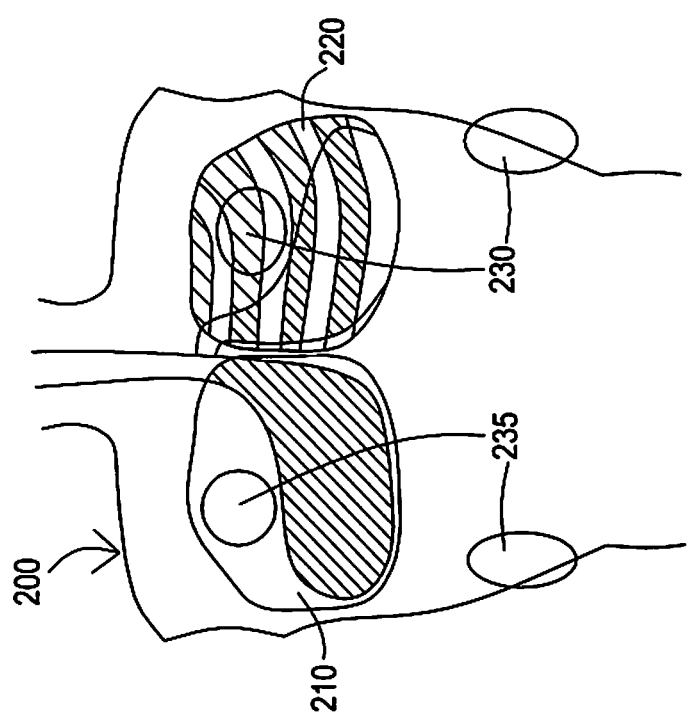
FIG. 5 is a cutaway view of the simulated torso of the invention showing the simulated lungs and ribs.
Figure 6:
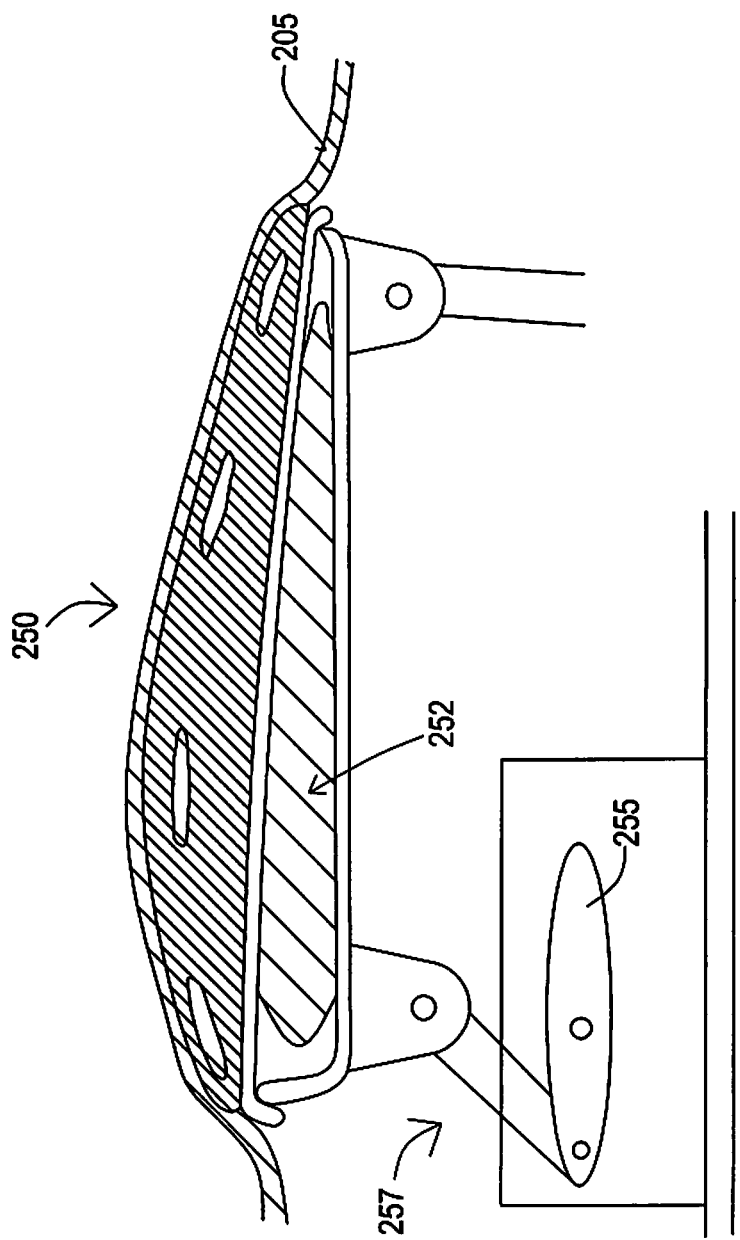
FIG. 6 is a side view of the lung platform housed within the simulated torso of FIG. 5.

Referring to FIG. 5, the torso can include simulated lungs and can include simulated ribs 220 above one or both of the lungs 210. In the example shown, the right side of the torso 200 can include ribs 220 separating the right lung 210 from the external simulated skin. For simulation purposes, the torso can include right and left needle chest decompression sites 230 and 235, respectively. Simulation of the lungs can include a two stage lung platform 250 as shown in FIG. 6. The two stage platform 250 located under the simulated torso skin 205 can include a balloon 252 that inflates when a student applies sufficient pneumatic pressure via a Bag Valve Mask (BVM) or the like for cricothyrotomy procedures. A servo motor can be connected by a pivoting arm 257 to the lung platform can be used to raise and lower the lung assembly 250 to simulate normal breathing or asymmetrical breathing for tension pneumothorax procedures.

The needle chest decompression sites can be separated from the lung balloon to prevent damage to the balloon. The lung balloons are encapsulated within the platform by the rib cage on top having a support layer underneath which protects the lung from punctures. A 1.5" diameter recess will be in the optimum area for NCD which will house the sensor depicting the puncture and at what angle for future 3D modeling regarding internal anatomy. The lung balloons are custom shaped to accommodate this layout and still maintain the volume needed for insufflation.

This simulator was designed to replicate both form and function regarding the human anatomy such that repeated uses could be performed in a timely manner at an economizing cost over using animal or cadaver tissues. The torso can also include the neck anatomy 700. FIGS. 7a, 7b and 7c show different simulated areas within the simulated neck anatomy 700. FIG. 7a is a side view of the simulated torso showing the simulated neck anatomy collar including the bronchi branch, foam simulated neck muscles and trachea stabilizer.

Referring to FIG. 7a, the torso (CRIC) has many components that can make up the head, throat, neck, trachea, cartilages, bronchi branch and lungs. The simulated neck device can include sensors to monitor both head and bust positions to determine initial assessment and interaction during a test and sensors within nostrils or in the head to monitor any nasopharyngeal airway placement within the trial. The sensors can detect any movement or orientation with the simulator, and can include but are not limited to 3-axis accelerometers and gyroscopes. These two types of sensors (accelerometers and gyroscopes can work in tandem to keep the margin of error to a minimum. The novel neckband collar can have a plurality of segmented chambers side by side with one another that each can be filled with a red liquid such as food coloring and the like to simulate blood. Students can slit into each of the chambers to simulate a cricothyrotomies, and the collar can be rotated about the neck for each student that is being trained. The fluid can be any type of fluid. For example, soapy water can be mixed with a red food coloring, since the soap is antibacterial.

Starting from the head down, the skull can be made from the same very rigid urethane the neck support and the rest of the torso support. The head skin can be SEBS (styrene-ethylene/butylene-styrene) because it can be formed fitted to slip over the skull and kept in place by a silicone neckband that houses the simulated blood plackets. This neck band 715 shown in FIG. 3b can be made from layers of silicone tape that is sprayed with pigmented silicone to match the head and torso skin color. The neck anatomy can have a foam filler 725 for two reasons, the first is to replicate the neck muscles and the second, is to help align the trachea assembly.

FIG. 7b is an exploded side view showing the active cricoids cartilage insert and FIG. 7c is an exploded view showing the tracheal soft tissue insert and membrane clip for the neck. The trachea assembly can be made up of four pieces; the thyroid and cricoids cartilages 720 and 730, trachea soft tissues 755 and a membrane holder or clip 760. FIG. 7a shows the neck anatomy and its importance to provide landmarks such as the thyroid & cricoids cartilages to make the incision.

An incision can be made on the neckband which will release a realistic volume of simulated blood for each trial and can be rotated easily for the next incision. A thin piece of plastic tape can be installed over the thyroid and sliding cricoids cartilage to act as the muscle & ligament tissues between them to be penetrated once the incision is made through the neckband. A tracheal hook or the like can be inserted into the incision to pull up on the sliding cricoids cartilage to provide room for installing an endotracheal tube or the like. There can be internal sensors placed in the bronchi branch that give feedback on endotracheal tube placement, which is critical for ventilation. There are sensors that can measure each lung volume during ventilation to determine bilateral symmetry proficiency. These types of sensors can include micro-touch switches because the inventors wanted to block the nasal passage as well. In future models these could have IR sensors to pick up any object within the nostril and have an actuator to block off a nostril or two. There can also be sensors that are used that monitor both head and bust positions to determine the initial assessment and interaction during the trial. There are sensors within the nostrils for any nasopharyngeal airway placement within the trial. These types of sensors can also include accelerometers and gyroscopes that were previously described.

The thyroid can be formed from a thin walled rigid foam such as urethane, while the cricoids cartilage can be made from a thin pliable foam such as urethane allowing for movement. The membrane holder 760 can be formed from thin walled plastic tubing that fits nicely around the soft trachea tissues 755 made of Silicone 20 that slides into the cartilages assembly 720. The bronchi branch 740 can be made of the very rigid foam such as urethane and has plastic nipples screwed into it for lung fixtures. The lungs can be dipped Latex that are held in place within the chest cavity by a dense foam that conforms to the inside of the support structure.

Experimentally, the trachea assembly went through many changes to find the right combination of materials that could be easily assembled for each new trial, retain its shape under warm conditions and replicate the anatomy in form and function. The thyroid started as thin walled plastic, but lost its shape over time and cracked. The material was changed to a pliable urethane, which made inserting the trachea soft tissue difficult. The preferred material from the experiments was rigid urethane that provided the durability needed for simulation usage.

The cricoids cartilage that attaches to the thyroid was originally a thin wall plastic that failed. Next, an aluminum strip was used, however, the aluminum strip cut through the air tube that is used for insufflation. Rigid urethane used for the thyroid was tested, but the rigid urethane did not allow for the movement necessary when inserting the air tube. As a result of the experiments, the preferred material for the cricoids cartilage is a pliable urethane that can be adapted into a sliding slot.

FIG. 8*a* shows an enlarged exterior front view of the sliding cricoids cartilage. FIG. 8*b* shows the active cricoids cartilage and tracheal soft tissue insert for the neck of FIG. 8*a*. FIG. 8*c* shows a cross-sectional view of the check and neck connections of FIG. 8*a*. The tracheal soft tissue insert can be inserted into the cartilage between the chin and the bronchi branch which is under the chest skin. A cross-sectional view of the sliding cricoids cartilage is shown in FIG. 8*c* and FIG. 8*d* shows an enlarged view of the sliding cartilage of FIG. 8*c* showing a pin for connecting the sliding cricoids cartilage 720 to the cartilage 730 to allow movement of the active cricoids cartilage 720.

From experimentation, the clasp on the neckbands have gone through a few changes such as; thin molded plastic clips, wire clasp, hook and loop (Velcro®) strips and metal spring clips. Although the Velcro® worked best, alternative fasteners can be substituted. The neckband with simulated blood packets has gone through design considerations such as; multiple thin tubes filled with the blood and sectioned off incrementally. Another example used nano encapsulation bulbs, but that had dismal bleeding effects when sliced.

Referring back to FIG. 1 which shows a complete body layout of the simulator with snap in place simulated limbs include, in the example shown, a partially amputated left arm 300 and an injured right arm 350; a partially amputated right leg 400 and a wounded left leg 450. Each of the simulated limbs can be snapped into the torso 200 by universal joints/electrical connectors 500 for training use.

FIG. 9*a* is front view of the simulated partially amputated left arm 300 detached from the torso 200 shown in FIG. 1. The wound can be simulated with LEDs 315 to simulate blood loss from the wound. FIG. 9*b* shows an LED 315 arrangement for the LED wound 310 of FIG. 9*a*, where bone screws 320 can be used to attach the LED arrangement to the wound location. FIGS. 9*a* and 9*c* show the universal joint for connecting the simulated left arm 300 to the simulated torso 200 of FIGS. 2*a*-2*c*. In the preferred embodiment, the left arm can have a simulated brachial pulse 330 that can be measured, and the LED lights can flash at different rates and different intensity levels to show blood loss.

Each of the left arm simulator 300 and right arm simulator 350 parts can function as a stand along simulator without the torso. FIGS. 9*c* and 10*c* show the touch screen interface to the simulation electronic module with on/off switch 620 and charge port 630. A training scenario for the left arm simulator 300 can allow students to practice applying tourniquets to stop the bleeding from the simulated wound. When the tourniquet is not applied correctly, the LED wound can be lit while, correction application of the tourniquets results in the LEDs having a lower intensity, be turned off or flash at a different rate to simulate a reduction in blood loss. Electronically, the simulated left arm 300 can include sensors for sensing application of the tourniquets in various areas. When the tourniquet is properly positioned, the sensor(s) detects the application and the LEDs are extinguished. The types of sensors that can be used here include but are not limited to force sensors, such as one manufactured by Flexiforce part # A201. For the invention, a sensor array was built with 16 sensors in a row covering almost 12 inches with a single ZIF connector.

FIG. 10*a* is a front view of the detached right arm 350 of FIG. 1 with various wound locations 310 along the arm, and universal joint connection 500 for the torso 200 of FIGS. 2*a*-2*c*. FIG. 10*b* is a front view of the detached right hand 355 from the right arm 350 of FIG. 10*a*, that can attach by a joint mechanism and/or male plug 360 and mating female socket, with the right hand 355 having at least one wound 310 location. FIG. 10*c* shows the touch screen 610 interface to an electronic simulation module for the right arm. FIG. 10*d* shows and an example of LED arrangement for the LEDs 315 simulating the wound(s) 310. Each of the LED arrangements can be used for the different arm wounds 310 and right hand wound 310 of FIGS. 10*a* and 10*b* and as previously described, have a variable intensity and flash rate where a lower intensity, turned off or flashing at a different rate can simulate a reduction in blood loss when a tourniquet is applied.

The left and right arm simulator can each include an inner support structure that is formed of very rigid foam such as urethane that is baked in ovens for final curing to reduce shrinkage. In the preferred embodiment, the intermediate layer for the muscle and fat layer can be a clear Silicone 40 and the skin can also be Silicone 40 that is pigmented to desired skin color depending on ethnicity. Similarly, the torso skin was changed from SEBS to a pigmented Silicone 40 due to the same compression scenario as the arms and legs. The simulated wound can be made of clear foam such as urethane painted with luminous paint for the LED's to glow through. The control bezel that frames the skin in the control area can also be a pigmented foam such as urethane.

Figure 11A:
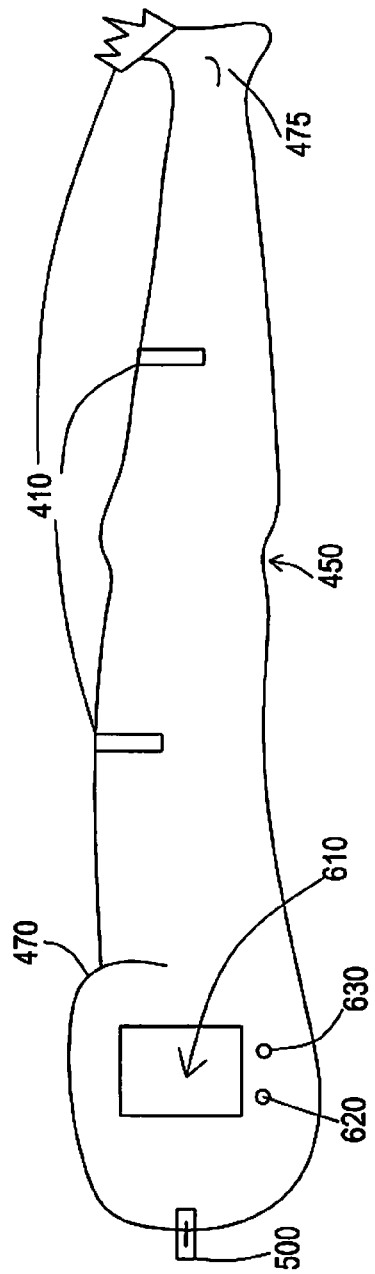
FIG. 11a is a front view of the detached left leg of FIG. 1 with LED wound(s).
Figure 11B:
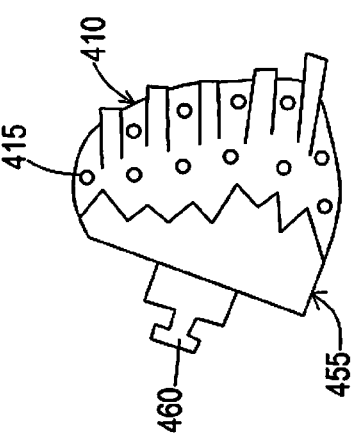
Figure 11C:
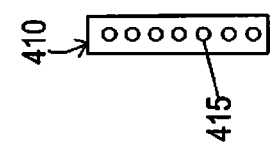
FIG. 11c shows an LED arrangement for the wounds of FIGS. 11a-11b.

FIG. 11a is a front view of the detached left leg 450 of FIG. 1 with LED wound(s) 410 with a femoral pulse 470 and/or tibia pulse 475 measurement point. The touch screen interface 610 can be located where the top of the left leg 450 is attached to the torso 200 of FIG. 2a by a universal swivel joint 500. The electronic simulation module interface can have an on/off switch 620 and charge. port 630. FIG. 11b is a front view of the detached foot 455 wound for the left leg 450 of FIG. 11a. FIG. 11c shows an LED 415 arrangement for the wounds 410 of FIGS. 11a and 11b.

Figure 12A:
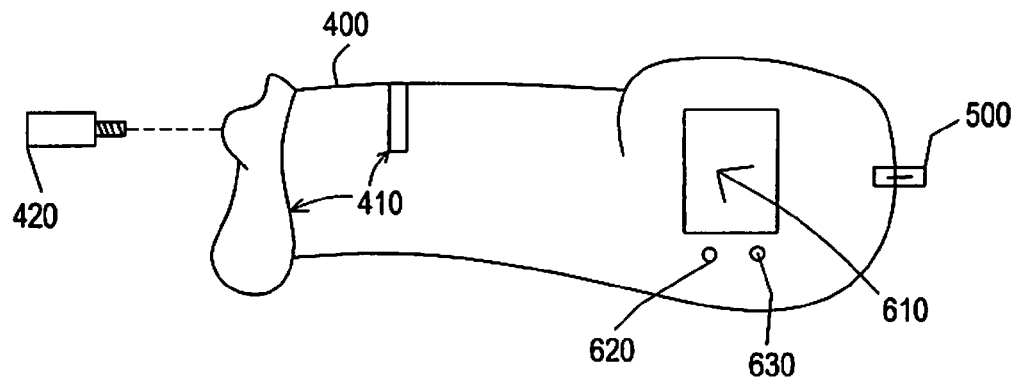
FIG. 12a is a front view of the detached right leg of FIG. 1 with LED wounds.
Figure 12B:
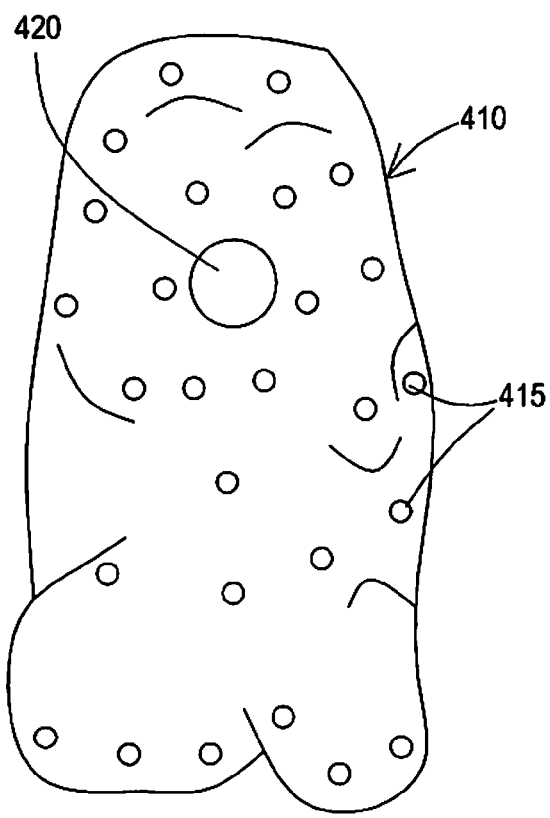
Figure 12C:
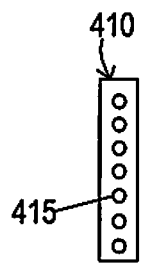

FIG. 12a is a front view of the detached right leg 400 of FIG. 1 with LED wounds 410 along the right leg 400 and at an amputated point. The part of the right leg 400 being attachable to the torso 200 can have a touch screen 610 interface with the right leg electronic simulation module, an on/off switch 620 and charge port 610, and universal joint 500 to attach to the torso 200. FIG. 12b shows an amputated end wound 410 with LEDs 415 simulating blood loss at the wound 410, with a bone screw 420 to attach the amputated wound 410 portion to the right leg 400. FIG. 12c shows an LED 415 arrangement for other wounds 410 along the right leg of FIG. 12a. As shown, the right leg simulation can include a popliteal pulse location.

Figure 12D:
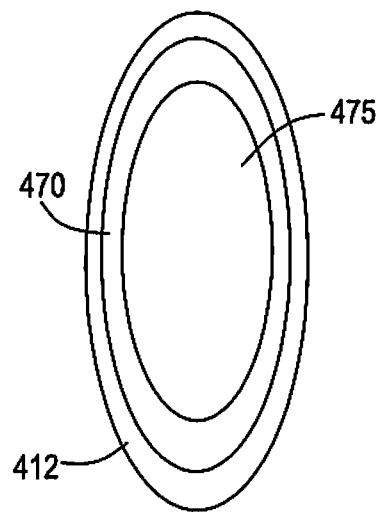

FIG. 12d is a cross-sectional view of the structural layers of the right leg of FIG. 12a showing bone 475 in the center with muscle 470 as the next layer and skin 412 as the outer layer. The left 450 and right 400 leg simulator each include an inner support structure shown as the bone 475 in FIG. 12d that is formed of very rigid foam such as urethane that can be baked in ovens for final curing to reduce shrinkage. The intermediate layer for the muscle and fat layer 470 can be a clear Silicone 40 and the skin 412 can also be Silicone 40 that is pigmented to desired skin color depending on ethnicity. The simulated wound 410 is made of clear foam such as urethane painted with luminous paint for the LED's 415 to glow through.

The LED wound arrangements can be located along the sides of the right arm, the left arm, the right leg and the left leg, and have a column or columns to signal wounds. The LED arrangements can also be located along any other wound locations on the right arm, the left arm, the right leg and the left leg. The LEDs can flash together or in sequence or in different rates or in different intensities or on any combination thereof. The LEDs can go off as blood flow is restricted by the tourniquet applications.

Figure 13:
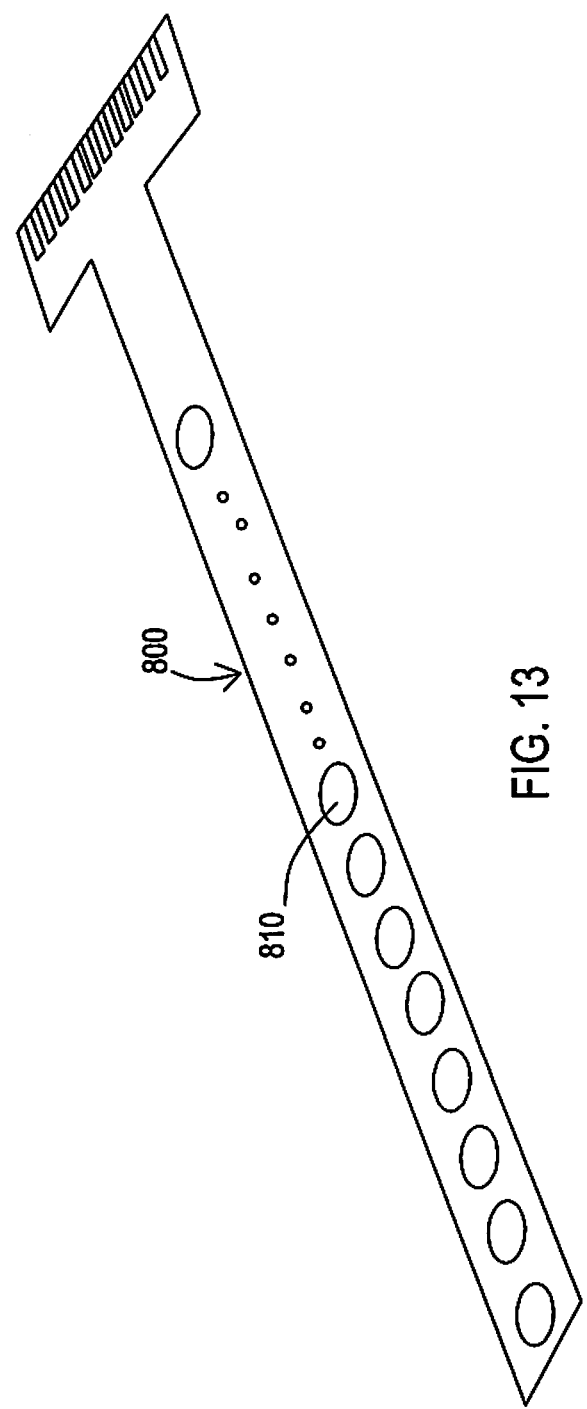
FIG. 13 shows a sensory array for the invention.

FIG. 13 shows a sensory array for the invention. The sensor array is significant because it consolidates a lot of material and circuitry into one simple unit for a more consistent coverage and easy installation in production. The connection between the sensor array and support electronics was dramatically reduced, which is very important when placing control systems within mannequin body parts. This sensor array allows for the pressure exerted on the skin and surrounding areas to be translated into a measurable force. The types of sensors used here can include force and pressure sensors, such as those manufactured by Tescan.

Each of the simulated body parts, the torso 200, left and right arms and right and left legs can include one or more sensory arrays 800 that include one or more rows of sensors 810 mounted on a semi rigid backplane shown in FIG. 13 that interfaces with the simulation electronic module corresponding to the body part. For example, one or more arrays of sensors can be located along the left arm 300 to detect pressure applied by a tourniquet within the range of the sensor.

Based on the approximate distance of the tourniquet to the sensors, the simulation electronics can cause one or more of the LEDs in the simulated wound to flash at a different or illuminate with a different intensity to simulate the amount of blood loss from the simulated wound with the tourniquet applied.

Figure 14:
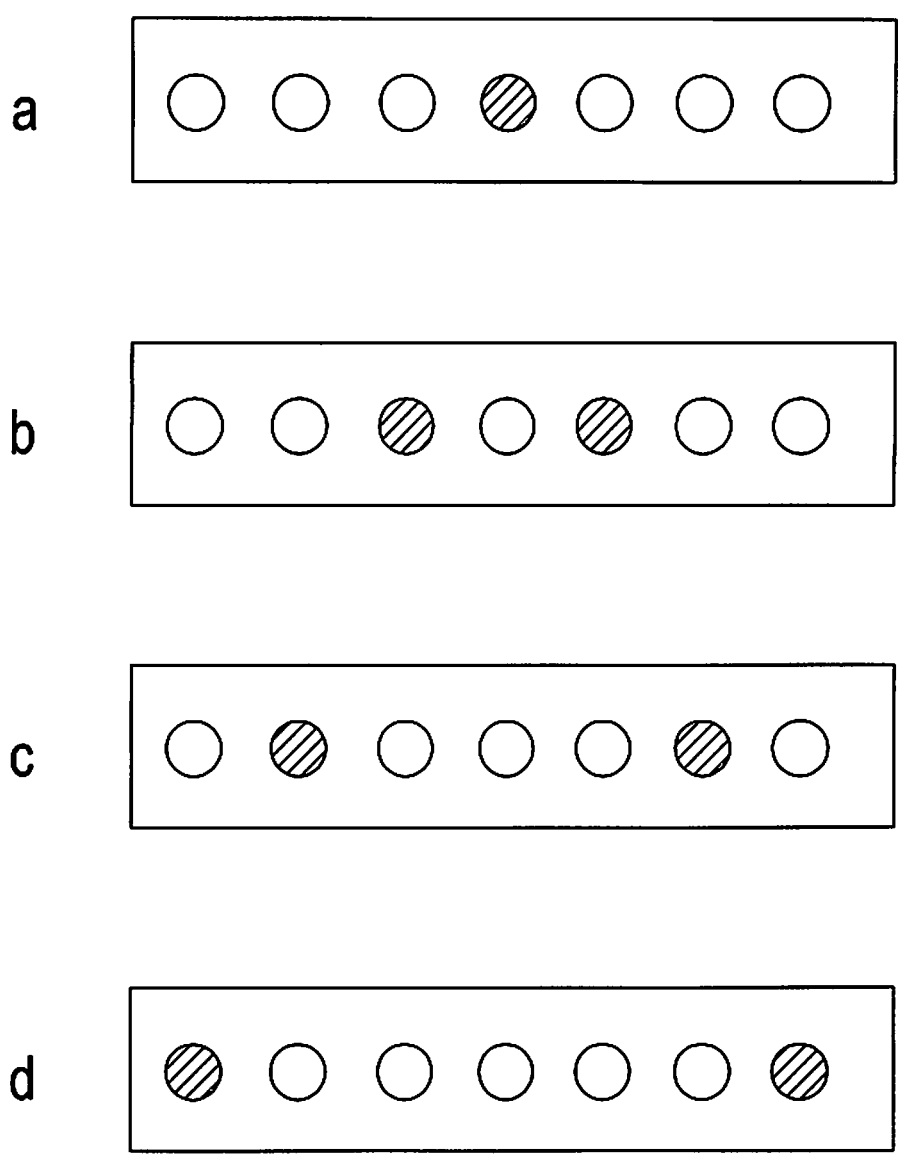
FIG. 14 shows examples of different LED arrangements for simulated wounds.
Figure 15:
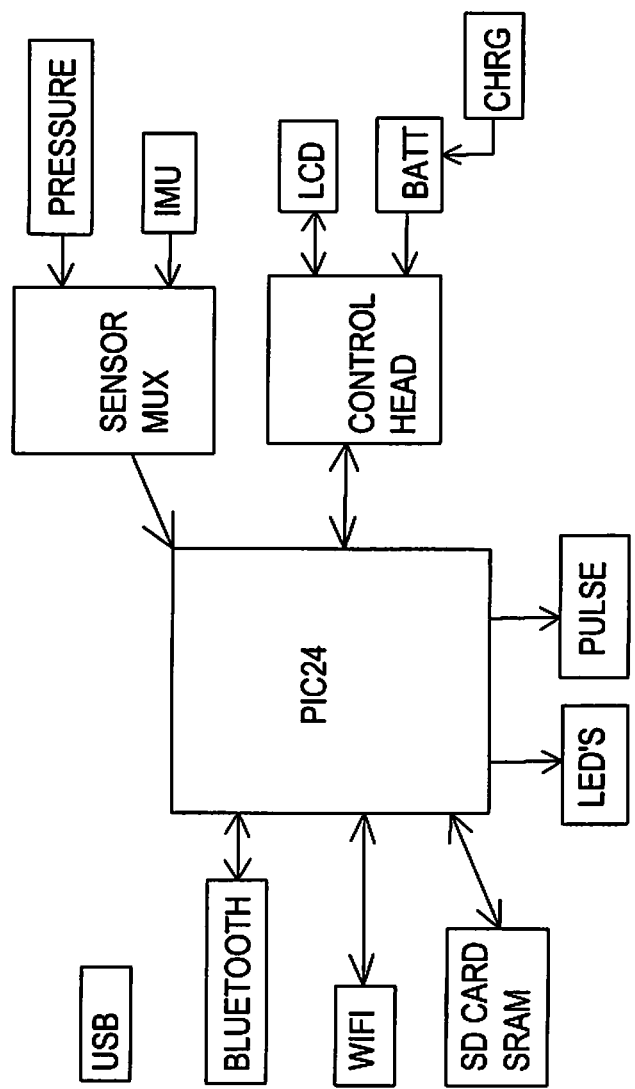
FIG. 15 shows a flowchart of the PIC 24 simulation module for the invention.

FIG. 15 shows examples of different LED arrangements for simulated wounds. For example, FIG. 14a shows the center LED that starts the sequence of flashing and LED illumination moves outward to depict movement within the simulated wound. The LED flashing rate (frequency of LED on versus off) can be controlled via the set-up menu to be synchronous with the pulse rate, for example, if the wound happened just after heavy exertion the pulse rate could be very rapid (120 bpm) at first with major blood loss and then slows as the physiological model changes. As pressure from the tourniquet increases, the outermost LED are dropped from the sequence until force is applied to staunch the simulated bleeding, then all of the LEDs are turned off. The LED's, pulse frequency and pulse intensity can be controlled independently via the set-up menu for evaluation.

FIG. 15 shows a flowchart of the electronic simulation module, PIC 24. As shown, the simulator includes a control processor and instruction to simulate different medical scenarios and respond to student input in response to the simulated injury scenario. Each individual simulated body part can include a sensors for detecting student actions and output to simulate the status of the injury. Each body part includes a processing device and simulation software, or microcode that runs on the arm, leg and torso devices. The simulation microcode provides for control and simulation of the device itself. The microcode responds to each sensor input in response to an output accordingly to the LEDs and pulse output. In addition, the simulation microcode provides a control protocol that can be used to communicate with the simulated body part. The types of sensors that can be used here include but are not limited to force and pressure sensors, positioning in 3D space, that can be in an analog or digital output that can be quantified in the PIC by using lines of code that determine the parameters given. A complete program can then complied into a HEX file which is then loaded onto the PIC. This process is very useful in that updates can be added at any time.

The computer control protocol supports querying capabilities of the devices, defining parameters of the current training scenario and output of current simulation state of the simulator. In addition, a number of commands are supported to configure aspects of the simulator (such as but not limited to the Bluetooth and Wi-Fi settings such as name, SSID, and the like).

An Application Programming Interface (API) supports application development using the simulator microcode. The API is a higher level communication scheme with each device and encapsulates the protocol that exists within the microcode itself. The API supports multiple devices and includes auto-detection of the device. The API can connect to a leg, arm and/or torso and determine which device it is connected to. In addition, the API supports application development across many different computer devices including conventional desktop personal computers as well as mobile communication devices such as but not limited to smart phones, iPhone®, iPad®, and Android devices, and even computer tablets. Advantages can include no stylus is required which could become lost, especially in the field, and these applications are much more popular than Windows PDA which is becoming obsolete. Alternatively, the mobile applications can connect to the arm, leg and torso devices through either Bluetooth or 802.11 "Wi-Fi" connections.

Third, the mobile "app" can actually drives the simulator itself. Through the use of the API and microcode protocol, the mobile app allows the selection of the simulated environment. For example, for the tourniquet training application, it allows the selection of the body type, time to bleed out and location of the injury. This is then communicated to the simulator, which then simulates the scenario and reports back patient state.

To support the device and microcode itself, a "flash programmer" was also developed to program the computer Programmable Integrated Circuit (PIC). Somewhat different to other programmers, this programmer was used to program the external flash chip that is used within the devices that provides necessary data to the device's operation. FIG. 15 shows a schematic block diagram of the PIC 24. The PIC24 is the core of each simulator to be programmed in such a way the end user needs no special skills to operate each simulator, but just interact with it for specific skills training.

The USB box is to show a physical serial connection to the PIC24 for updates or monitoring if needed. The Bluetooth box is to show it has Bluetooth radio connectivity to send and receive data wirelessly. The Wi-Fi box is to show it has a Wi-Fi radio to send and receive data wirelessly. SRAM box is for additional memory that can be used for programming and/or storage. The LED box shows the PIC controlling the simulator LEDs function and the pulse box shows the PIC controlling the tactors for tactile stimulus as an output device. The pressure sensor box is representative of the sensor array that sends data to the sensor mux that parses this input to the PIC on an individual basis.

The IMU box can be made up of an accelerometer and gyroscope data that is pasted to the sensor mux for 3D data processing. The sensor mux allows for consolidating 8 inputs unto one input line to the PIC. The charge box represents the external charge port going to the battery, although, the charging function can become inductive in the future. The battery can be linked to the control head via the on/off switch, which powers the simulator and reports the status of charge. The LCD(liquid crystal display) box can be representative of the touch-screen display that graphically illustrates the information pertinent to the simulators operation. The Control Head can be representative of the human interface area where the on/off switch, charge port and touch screen display are located to translate these functions into intuitive operations.

To support individualized training with or without the presence of an instructor, we also invented a training component that provides task specific education in a series of modules that correspond with the selected training task. The training component can support multimedia training including but not limited to text, audio, video and/or interactive quizzes. The training software can include a login by username and password with an administrative screen and records quiz scores in a database on a user specific basis. The database was designed to be queried by the training software to return competencies and deficiencies to create a framework for micro-adaptive deliberate training that alters the course structure to improve learning outcomes on a user by user basis.

To support large training environments such as a classroom setting, the present invention can include an aggregating computer software application referred to as the "HapMed Hub." The mobile device described earlier works well with a single training set-up (whether a single device or a single body) meant for a single trainee. In a classroom setting where there could be multiple devices all in one room, the mobile device can be inadequate. In this scenario the "hub" system can coordinate all of the devices within the room. It can control multiple devices at once and provide an overall summary of current conditions of each device.

In addition, the simulator can support multiple mobile devices connecting to it as well. This latter aspect allows the concept of an instructor walking through the classroom. For example, he/she could "connect" to a given trainee's station to see a current state of the simulation, and then disconnect and re-connect to a neighboring system. In addition, the "Hub" can also notify the instructor to a trainee that may be performing poorly (e.g. whose simulated patient may be perishing). Fundamentally, the aggregating control hub addresses technical problems that arise from a multi-device set-up such as a classroom or lab.

Figure 16C:
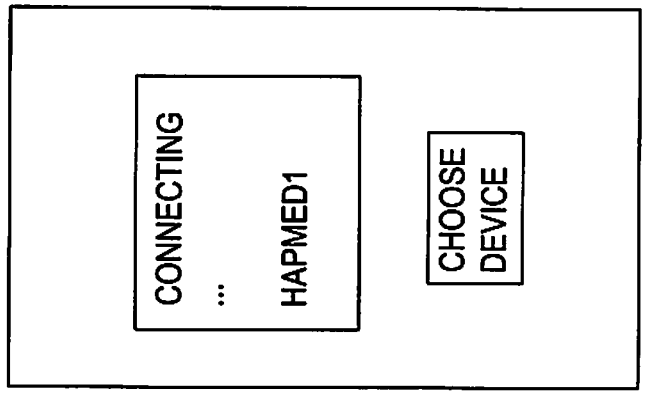
FIG. 16c is a screen shot of the connecting screen on the HapMed for the invention.
Figure 16B:
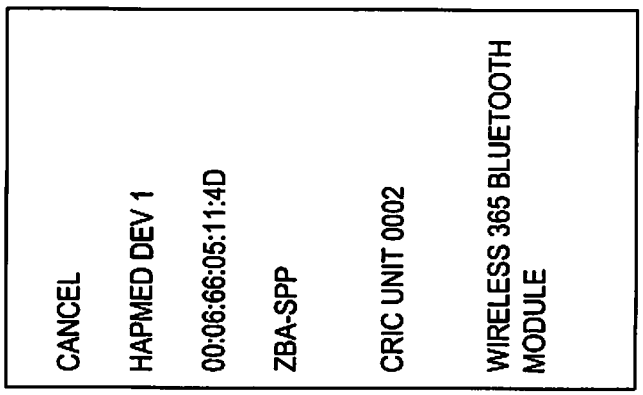
FIG. 16b is a screen shot of the device list on the HapMed for the invention.
Figure 16A:
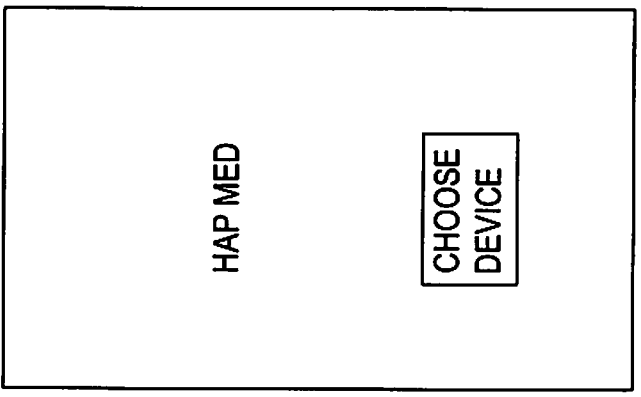
FIG. 16a is a screen shot of the start screen on the HapMed for the invention.

FIG. 16a through 18c show examples of screen shots displayed during simulation training using the handheld HapMed device. FIG. 16a shows a screen shot of the start screen on the HapMed and FIG. 16b is a screen shot of the initializing device list displayed on the HapMed screen. Since the HapMed device remotely communicates with the simulated body, FIG. 16c shows a screen shot of the connecting screen.

Figure 17C:
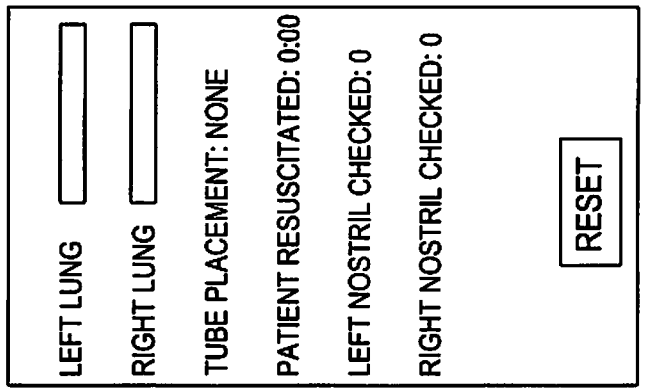
FIG. 17c is a screen shot of the leg discussion screen on the HapMed for the invention.
Figure 17B:
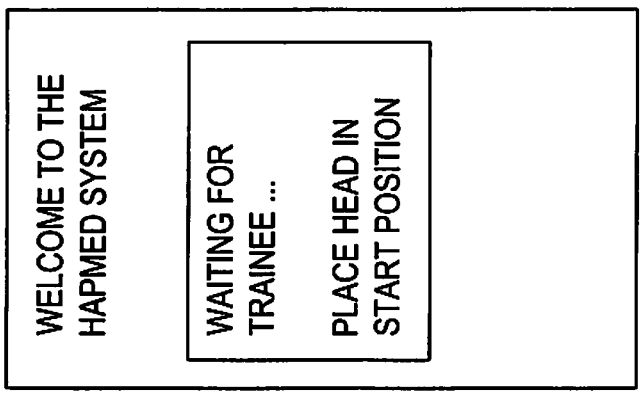
FIG. 17b is a screen shot of the leg simulation screen on the HapMed for the invention.
Figure 17A:
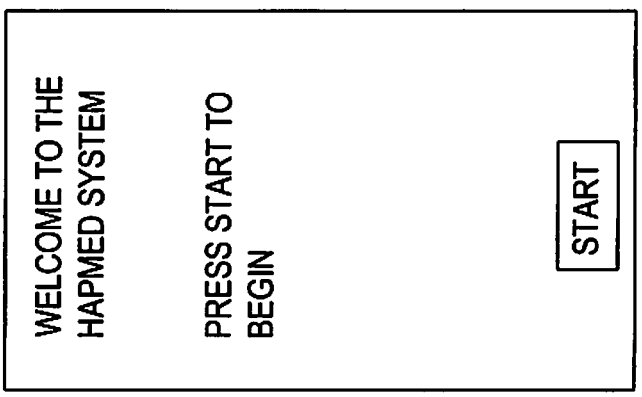
FIG. 17a is a screen shot of the leg setup screen on the HapMed for the invention.

Once the HapMed device is communicating with the simulated body or body part, a start set-up screen such as the screen shot shown in FIG. 17a is displayed on the HapMed display screen. FIG. 17b is an instructional screen shot instructing the student to put the head in the start position and FIG. 17c shows an example of a screen shot displaying the result screen that is populated as the user administers the necessary life saving steps such as checking each nostril, and showing the condition of each lung. The screen can also display whether or not the student inserted a tube and if the simulated patient was successfully resuscitated. After the simulation exercise is complete, the user can reset the simulation.

Another simulation example is shown in FIGS. 18a-18c. In this example, the user first selects a wound location, a simulated body size, the time allowed before the simulated patient bleeds out and allows insertion of a time delay before the simulated medical emergency starts. In this example, the simulated injury is a leg injury. When the simulation starts, the display screen shows if a tourniquet has been used, how many tourniquets are used, if the bleeding has stopped and the status of the patient as shown in FIG. 18b.

The screen can also show the patient's blood pressure and the blood flow rate. When the simulation is complete, the user can select discussion to receive a discussion of the results or can reset the simulator. FIG. 18c shows a screen shot of the leg discussion screen on the HapMed. FIGS. 16a-18c are shown various examples only, those experience in the art of simulation will clearly understand that alternative simulation scenarios that can be presented.

Figure 19:
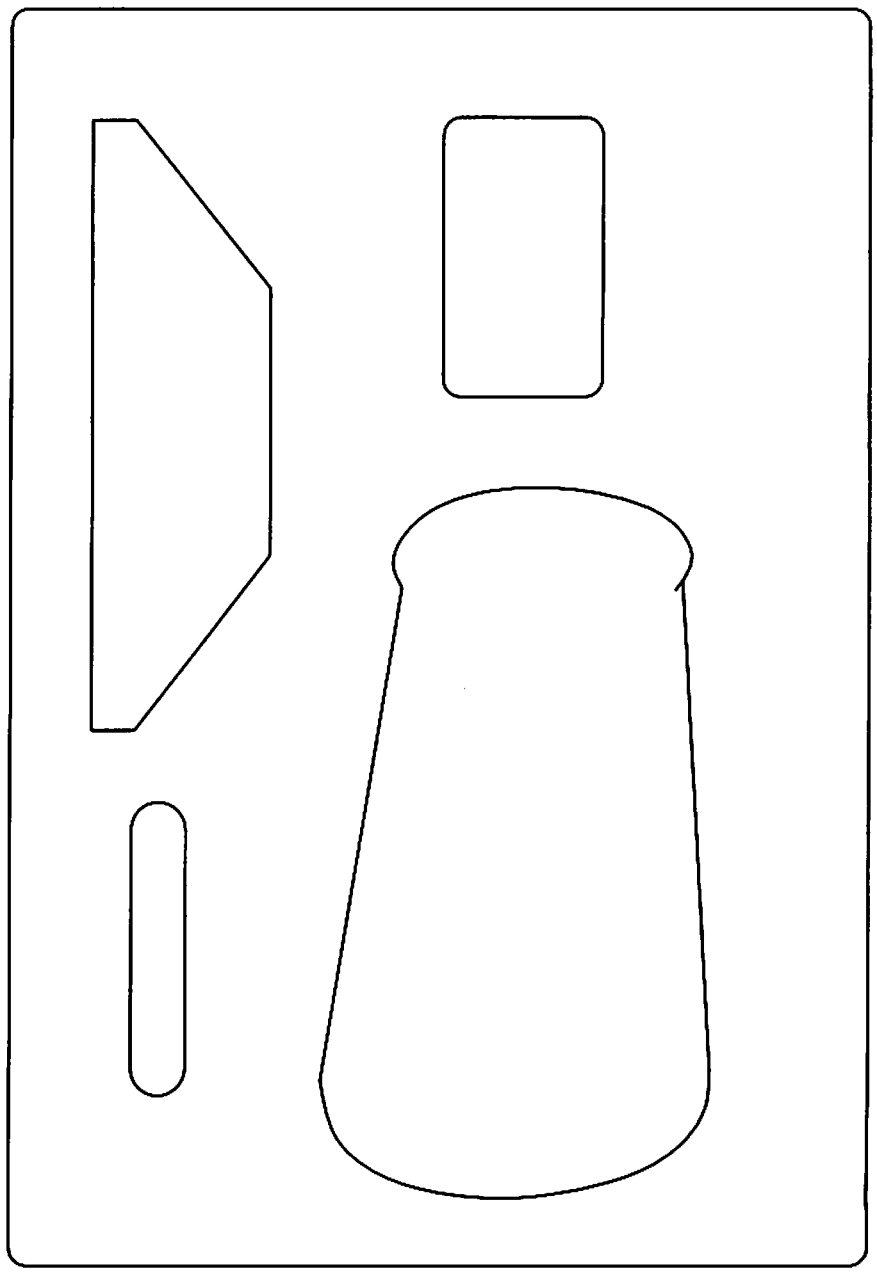
FIG. 19 shows a case foam cutout having pockets for the Cric kit, Android™, neckbands and CRIC torso of FIGS. 2a-2c.
Figure 20:
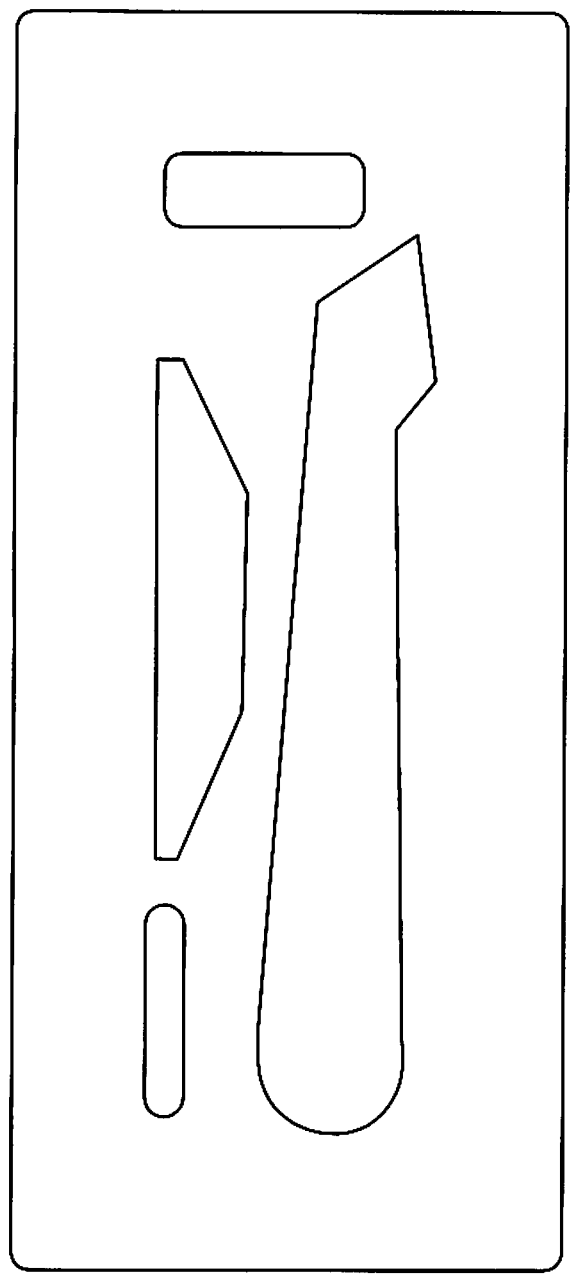
FIG. 20 shows a case foam cutout for the left arm for FIG. 19.

The simulator can include travel cases for transporting and mobility so that the simulated body parts to remote location for training in the field. FIGS. 19 and 20 shows a case foam cutout for the left arm and right arm, respectively, with a pocket for the wireless control android to activate and control the left arm simulation, a pocket for a stand to support the left arm during training, and a pocket for tourniquets that can be used for training purposes.

Figure 21:
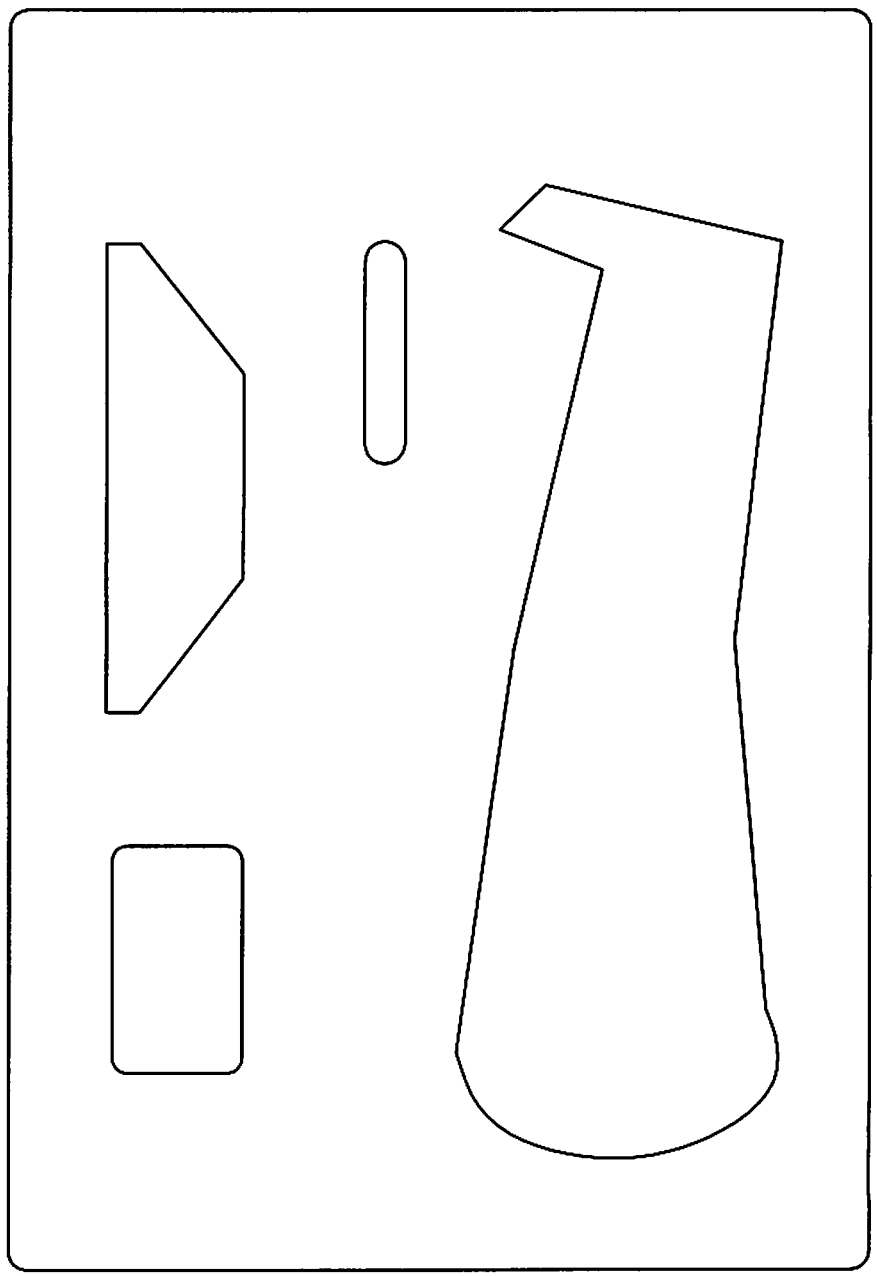
FIG. 21 shows a case foam cutout for the right arm FIG. 19.
Figure 22:
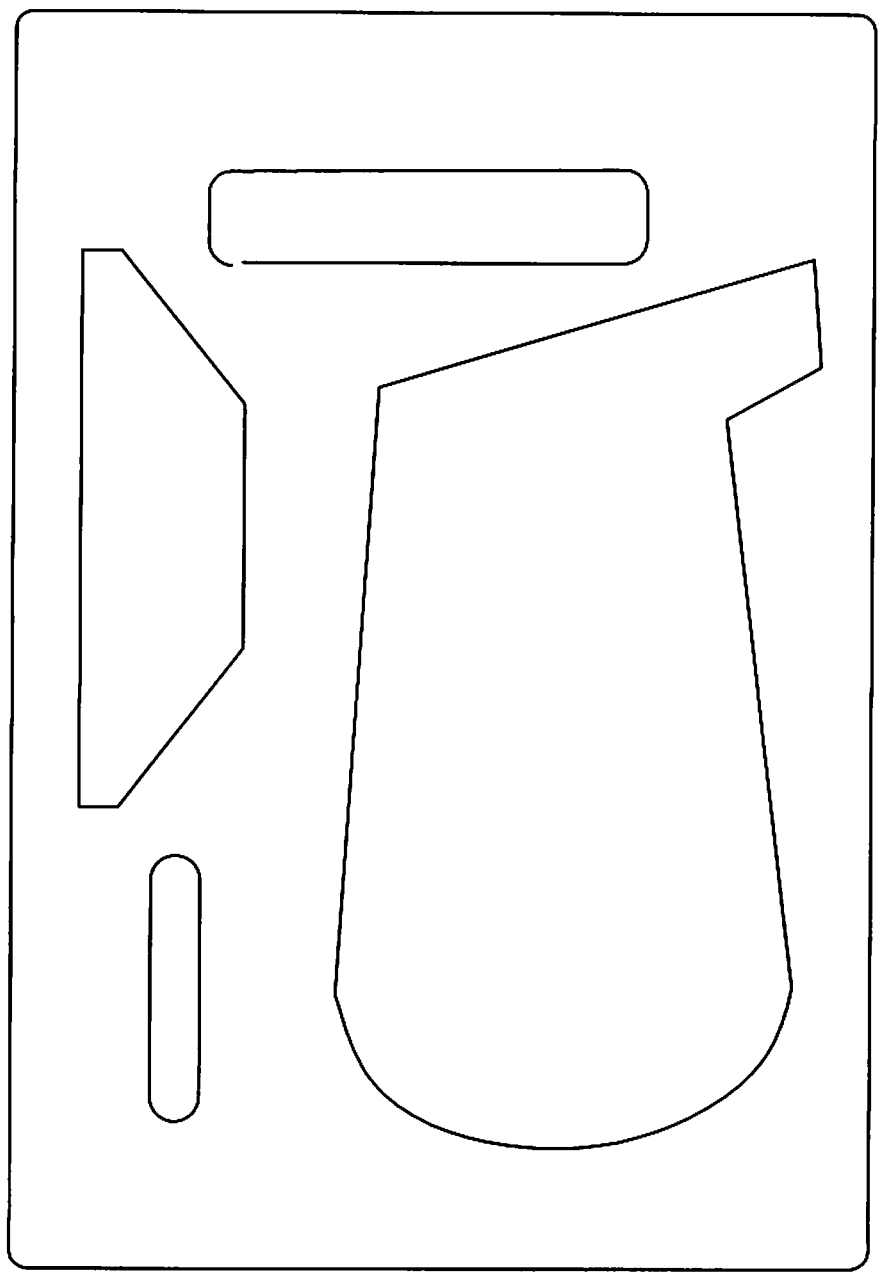
FIG. 22 shows a case foam cutout for the left leg FIG. 19.

FIG. 21-22 shows a case foam cutout for the left leg and right leg, respectively, with a pocket for the wireless control android (or any type of smart phone) to activate and control the simulated leg, a pocket for a stand to support the simulated leg, and pocket for tourniquets that can be used during training.

Figure 23:
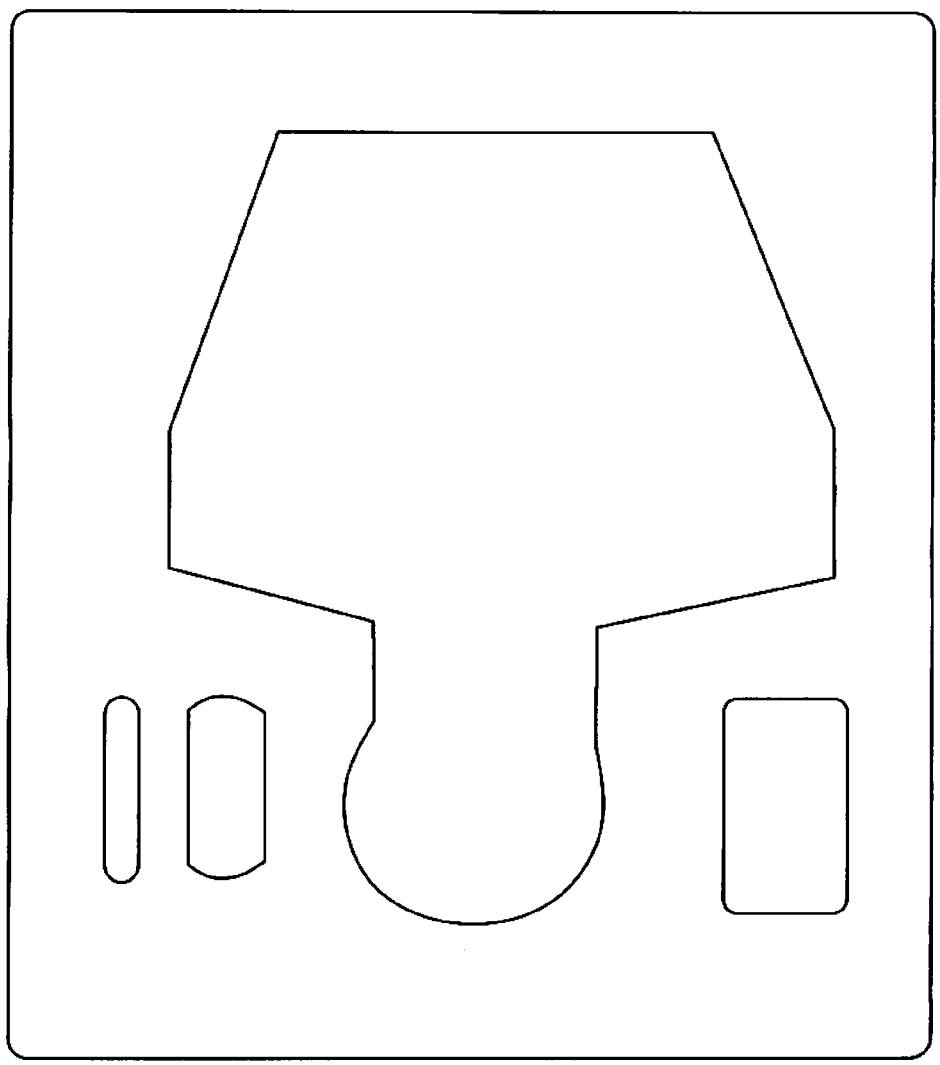
FIG. 23 shows a case foam cutout for the right leg FIG. 19.

FIG. 23 shows a case foam cutout for the torso with a pocket for the wireless control android to activate and control the simulated torso, a pocket for simulation neckbands that can be used during training.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A modular simulation system for trauma assessment and tourniquet, cricoids cartilage and tension pneumothorax training, consisting essentially of:
   a torso with detachable limbs each including sensors for detecting a simulated user activity and outputs to simulate an injury status in response to the user activity;
   a mechanical snap in place universal swivel joint consisting of a male component member insertable into a female component to attach each of the one or more limbs to the torso, the universal swivel joint located on an exterior surface of the torso and detachable limbs;
   a simulated exterior skin covering the torso and limbs leaving the universal swivel joint exposed; and
   two or more self-contained processor based controllers for executing instructions stored in memory and a power source, each processor connected within each of the torso and the detachable limbs for standalone simulator operation of each individual torso and each limb, each controller connected with the sensors and the outputs within the corresponding one of the torso and each limb.

2. The modular simulation system of claim 1, wherein the detachable limbs further include:
   a right arm, a left arm, a right leg and a left leg, and each detached limb forming an independent simulator.

3. The simulator of claim 2 wherein each arm further includes:
   a simulated partial amputation of one of the arm and a hand.

4. The modular simulation system of claim 2 wherein each arm further includes:
   a simulated injured arm having one or more simulated lacerations.

5. The modular simulation system of claim 2 wherein each leg further includes:
   a simulated partial amputation of one of the leg and a foot.

6. The modular simulation system of claim 2 wherein each leg further includes:
   a simulated injured leg having one or more simulated lacerations.

7. The modular simulation system of claim 2, wherein the outputs further include:
   one or more LEDS (light emitting diodes) connected to each of the limbs arranged in a pattern on the limb to simulate a bleeding injury, and
   a set of instructions for each processor controlling the LEDS (light emitting diodes), the set of instructions including on, off, intensity, pattern, flashing and flashing rate, and duration.

8. The modular simulation system of claim 7, wherein the set of instructions further include:
   a first subset of instruction to activate the LEDS to indicate blood loss to turn off the LEDS in sequence as a tourniquet is applied to a limb to indicate lower amounts of blood loss.

9. The modular system of claim 2, wherein each of the limbs include a pulse simulator for determining a pulse in the limb.

10. The modular system of claim 2, further comprising:
    an independent carrying case for carrying one or more of the torso, the right arm, the left arm, the left leg and the right leg.

11. The modular system of claim 2, wherein the controllers for the torso, the right arm, the left arm, the right leg and the left leg each include a touch screen.

12. The modular simulation system of claim 1, wherein the torso further includes:
    an inner support structure to simulate a skeletal structure;
    an intermediate layer covering the inner support structure to simulate muscle and body fat; and
    a simulated outer skin covering the intermediate layer.

13. The modular simulation system of claim 12 wherein the simulated outer skin further includes:
    a styrene-ethylene/butylenes-styrene material.

14. The modular simulation system of claim 12 wherein the sensors further includes:
    an arrangement of sensors between the simulated outer skin and one of the intermediate layer and the inner support structure for sensing application of a tourniquet around the simulated limb.

15. The modular simulation system of claim 12 wherein the torso further includes:
    a simulated lung including an inflatable balloon positioned under the simulated outer skin on the torso, the inflatable balloon controllably raised and lowered to simulate breathing; and
    a molded rib structure located between the simulated lung and the simulated outer skin.

16. The modular simulation system of claim 15 further comprising:
    a needle chest compression site separated from the inflatable balloon to prevent damage to the balloon;
    a support layer between the rib structure and the inflatable balloon to protect the balloon from puncture.

17. The modular simulation system of claim 16 wherein the torso includes:
    a two stage lung platform controllably raised and lowered to simulate breathing.

18. The modular simulation system of claim 1 wherein the torso includes:
    a simulated neck and head anatomy including a neck anatomy collar simulating a bronchi branch, foam simulated neck muscles and a trachea stabilizer; and
    one or more neck sensors for monitoring a head and chest position to determine initial assessment and interaction during the simulation.

19. The modular simulation system of claim 18 wherein the simulated neck anatomy further includes:
    a rotatable neck band having separate chambers with red colored fluid for teaching cricothyrotomies procedures.

20. The modular simulation system of claim 19, wherein the torso further includes:
    a simulated active cricoids cartilage that surrounds a simulated tracheal soft tissue insert.

21. The modular simulation system of claim 19, wherein the torso further includes:
    a simulated sliding cricoids cartilage.

22. The modular simulation system of claim 20 wherein the simulated active cricoids cartilage is made of a pliable urethane foam to allow for movement.

23. The modular system of claim 1, wherein each of the carrying cases includes:

a case cutout for the torso, and a cutout for each limb, with a pocket for wireless control, a pocket for a stand and a pocket for removable tourniquets.

24. The modular system of claim 1, further comprising:
a wireless handheld device for presenting educational content and controlling the torso and detachable limbs.

25. The modular system of claim 24, wherein the wireless device is a smart phone.

26. A cricothyrotomies training tool, comprising:
a simulated torso with a neck and head anatomy including a neck anatomy collar simulating one or more of a bronchi branch, foam simulated neck muscles and a trachea stabilizer; and
a rotatable circular neckband collar having a plurality of side by side separated chambers, each of the chambers being sealed with colored fluid therein, wherein wrapping the circular neck collar about the simulated neck allows for students to continuously train for a cricothyrotomy by cutting a slit into a chamber in front of the trachea, and the collar is rotated so that an uncut chamber is located in front of the trachea.

27. The cricothyrotomies training tool of claim 26, wherein the fluid is food coloring in soapy water.

28. A simulated neck device with cartilage for teaching tracheotomies, comprising:
a simulated torso with a neck and head anatomy including a neck anatomy collar simulating one or more of a bronchi branch, foam simulated neck muscles and a trachea stabilizer,
a thyroid and sliding cricoids cartilage on a front portion of a simulated neck; and
a thin piece of plastic tape is installed over the thyroid & sliding cricoids cartilage to simulate a muscle and ligament tissues for allowing a trainee to form an incision into the tape, and
a tracheal hook insertable into the incision to contact the sliding cricoids cartilage for simulating installation of an endotracheal tube.

29. The simulated neck device of claim 28, further comprising:
a rotatable circular neck band wrapped around the simulated neck and having a plurality of side by side separated chambers, each of the chambers being sealed with colored fluid therein, wherein the neck band allows for trainees to continuously train for a cricothyrotomies the collar is rotated so that an uncut chamber is located in front of the trachea for each subsequent trainee.

30. The simulated neck device of claim 28, further comprising:
internal sensors placed in a bronchi branch in the simulated neck device providing feedback on endotracheal tube placement, the sensors measure each lung volume during ventilation to determine bilateral symmetry proficiency.

31. The simulated neck device of claim 28 further comprising:
sensors to monitor both head and bust positions to determine initial assessment and interaction during a test; and
sensors within nostrils or the head to monitor any nasopharyngeal airway placement within the trial.

* * * * *